(12) United States Patent
Spangler (10) Patent No.: US 10,184,341 B2
(45) Date of Patent: Jan. 22, 2019

(54) AIRFOIL BAFFLE WITH WEDGE REGION

(71) Applicant: United Technologies Corporation, Hartford, CT (US)

(72) Inventor: Brandon W. Spangler, Vernon, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 703 days.

(21) Appl. No.: 14/824,307

(22) Filed: Aug. 12, 2015

(65) Prior Publication Data
US 2017/0044907 A1    Feb. 16, 2017

(51) Int. Cl.
F01D 5/18 (2006.01)
F01D 25/12 (2006.01)
F01D 9/04 (2006.01)

(52) U.S. Cl.
CPC ............ *F01D 5/187* (2013.01); *F01D 5/188* (2013.01); *F01D 9/041* (2013.01); *F01D 25/12* (2013.01); *F05D 2220/32* (2013.01); *F05D 2240/12* (2013.01); *F05D 2240/126* (2013.01); *F05D 2250/185* (2013.01); *F05D 2260/201* (2013.01); *F05D 2260/22141* (2013.01); *Y02T 50/676* (2013.01)

(58) Field of Classification Search
CPC .......... F01D 5/187; F01D 5/188; F01D 25/12; F01D 9/041; Y02T 50/676; F05D 2250/185
See application file for complete search history.

(56) References Cited

U.S. PATENT DOCUMENTS

| | | | | |
|---|---|---|---|---|
| 3,966,357 A | | 6/1976 | Corsmeier | |
| 4,474,532 A | | 10/1984 | Pazder | |
| 4,500,258 A | * | 2/1985 | Dodd | F01D 5/187 |
| | | | | 416/96 R |
| 5,704,763 A | * | 1/1998 | Lee | F01D 5/188 |
| | | | | 415/115 |
| 5,772,397 A | * | 6/1998 | Morris | F01D 5/187 |
| | | | | 415/115 |

(Continued)

FOREIGN PATENT DOCUMENTS

| | | |
|---|---|---|
| EP | 0785339 | 7/1997 |
| EP | 1793086 | 6/2007 |

(Continued)

OTHER PUBLICATIONS

European Search Report for European Application No. 16183715.8 completed Feb. 16, 2017.

*Primary Examiner* — Jason Shanske
*Assistant Examiner* — Topaz L Elliott
(74) *Attorney, Agent, or Firm* — Carlson, Gaskey & Olds, P.C.

(57) ABSTRACT

An airfoil according to an exemplary aspect of the present disclosure includes, among other things, an airfoil body that has an internal passage for conveying a fluid flow. The internal passage includes first and second passage sections and a turn section that connects the first and second passage sections. A baffle is located in the second passage section and the turn section. The baffle includes a wedge region situated in at least the turn section and is oriented to either divide or join the fluid flow through the turn section.

17 Claims, 4 Drawing Sheets

(56) References Cited

U.S. PATENT DOCUMENTS

| | | | |
|---|---|---|---|
| 6,193,465 B1 | 2/2001 | Liotta et al. | |
| 6,431,824 B2 * | 8/2002 | Schotsch | F01D 9/02 |
| | | | 374/145 |
| 6,554,563 B2 | 4/2003 | Noe et al. | |
| 6,589,010 B2 * | 7/2003 | Itzel | F01D 5/187 |
| | | | 415/1 |
| 6,742,984 B1 | 6/2004 | Itzel et al. | |
| 6,890,153 B2 * | 5/2005 | Demers | F01D 5/186 |
| | | | 415/1 |
| 6,939,102 B2 | 9/2005 | Liang | |
| 6,974,308 B2 * | 12/2005 | Halfmann | B22C 9/04 |
| | | | 415/115 |
| 7,137,784 B2 | 11/2006 | Hall et al. | |
| 8,109,724 B2 | 2/2012 | Malecki et al. | |
| 8,152,468 B2 | 4/2012 | Propheter-Hinckley et al. | |
| 9,228,439 B2 * | 1/2016 | Pointon | F01D 5/186 |
| 2007/0048136 A1 | 3/2007 | Boury et al. | |
| 2008/0317585 A1 | 12/2008 | Lee et al. | |
| 2009/0246023 A1 | 10/2009 | Chon et al. | |
| 2010/0054915 A1 | 3/2010 | Devore et al. | |
| 2010/0124485 A1 | 5/2010 | Tibbott | |
| 2012/0034100 A1 | 2/2012 | Malecki et al. | |
| 2013/0052008 A1 | 2/2013 | Spangler | |
| 2013/0223987 A1 | 8/2013 | Stafford et al. | |
| 2014/0093390 A1 * | 4/2014 | Pointon | F01D 5/186 |
| | | | 416/97 R |

FOREIGN PATENT DOCUMENTS

| | | |
|---|---|---|
| EP | 2107214 | 10/2009 |
| WO | 2014126674 | 8/2014 |
| WO | 2015030926 | 3/2015 |

\* cited by examiner

AIRFOIL BAFFLE WITH WEDGE REGION

STATEMENT REGARDING FEDERALLY SPONSORED RESEARCH OR DEVELOPMENT

This invention was made with government support under Contract No. FA8650-09-D-2923-0021, awarded by the United States Air Force. The Government has certain rights in this invention.

BACKGROUND

A gas turbine engine typically includes a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and, if in the engine design, a fan section for propulsion. The compressor section typically includes low and high pressure compressors, and the turbine section includes low and high pressure turbines.

SUMMARY

An airfoil according to an example of the present disclosure includes an airfoil body having an internal passage for conveying a fluid flow. The internal passage includes first and second passage sections and a turn section connecting the first and second passage sections, and a baffle in the second passage section and the turn section. The baffle includes a wedge region situated in at least the turn section and oriented to either divide or join the fluid flow through the turn section.

In a further embodiment of any of the forgoing embodiments, the baffle is elongated and the wedge region has an apex, and the apex is oriented in a direction transverse to a longitudinal direction of the baffle.

In a further embodiment of any of the forgoing embodiments, the baffle includes a non-wedge region and a transition region between the wedge region and the non-wedge region, and a slope of the wedge region becomes shallower along the transition region toward the non-wedge region.

In a further embodiment of any of the forgoing embodiments, a rib separates the first and second passage sections. The rib has a terminal end at the turn section, and the baffle includes a ledge that sits on the terminal end of the rib.

In a further embodiment of any of the forgoing embodiments, the wedge region includes first and second sloped sides that are joined at an apex. The first sloped side forms an angle with respect to an immediately adjacent side wall of the turn section, and the angle is less than 45°.

In a further embodiment of any of the forgoing embodiments, the angle is in a range of 20° to 35°.

In a further embodiment of any of the forgoing embodiments, the baffle is elongated and a cross-section of the wedge region taken transverse to a longitudinal direction of the baffle has three to six distinct sides.

In a further embodiment of any of the forgoing embodiments, the baffle extends outside of the internal passage.

In a further embodiment of any of the forgoing embodiments, the internal passage is a serpentine passage.

In a further embodiment of any of the forgoing embodiments, the baffle has a hollow interior that is fluidly closed with respect to the internal passage of the airfoil.

A baffle for an airfoil according to an example of the present disclosure includes an elongated body extending in a longitudinal direction and having a geometry that is complimentary to an internal passage of an airfoil. The elongated body includes a wedge region at an end thereof. The wedge region includes an apex that is oriented in a direction transverse to the longitudinal direction.

In a further embodiment of any of the forgoing embodiments, the baffle includes a non-wedge region and a transition region between the wedge region and the non-wedge region, and an angle of the wedge region becomes shallower along the transition region toward the non-wedge region.

In a further embodiment of any of the forgoing embodiments, the baffle includes a ledge inboard of the wedge region.

In a further embodiment of any of the forgoing embodiments, the wedge region includes first and second sloped sides that are joined at an apex. The first and second sloped sides form an acute angle with respect to each other.

In a further embodiment of any of the forgoing embodiments, a cross-section of the wedge region taken transverse to the longitudinal direction of the baffle has three to six distinct sides.

In a further embodiment of any of the forgoing embodiments, the baffle has a hollow interior that is fluidly closed.

A gas turbine engine according to an example of the present disclosure includes a compressor section, a combustor section in communication with the compressor section, a turbine section in communication with the combustor section. At least one of the compressor section or the turbine section includes an airfoil. The airfoil includes an airfoil body having an internal passage for conveying a fluid flow. The internal passage includes first and second passage sections and a turn section connecting the first and second passage sections, and a baffle in the second passage section and the turn section. The baffle includes a wedge region situated in at least the turn section and oriented to either divide or join the fluid flow through the turn section.

In a further embodiment of any of the forgoing embodiments, the baffle includes a non-wedge region and a transition region between the wedge region and the non-wedge region, and an angle of the wedge region becomes shallower along the transition region toward the non-wedge region.

In a further embodiment of any of the forgoing embodiments, the baffle has a hollow interior that is fluidly closed with respect to the internal passage of the airfoil.

In a further embodiment of any of the forgoing embodiments, a rib separates the first and second passage sections. The rib has a terminal end at the turn section, and the baffle includes a ledge that sits on the terminal end of the rib.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
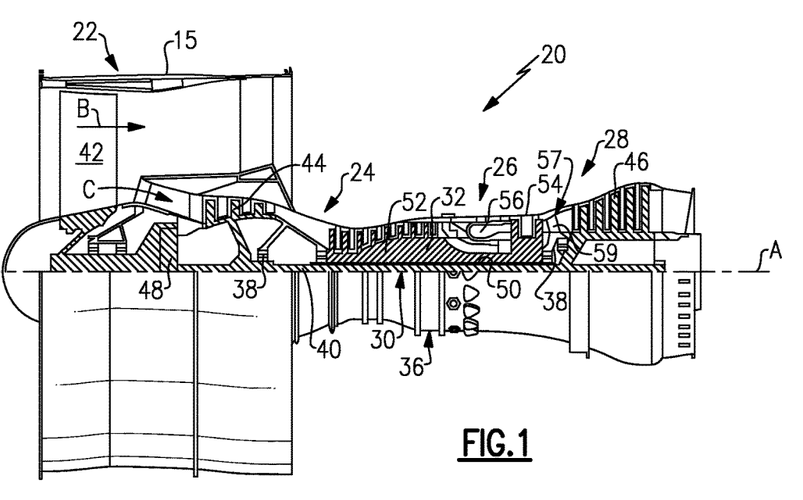
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The concepts described herein are not limited to use with turbofans and may be applied to other types of turbine engines, such as three-spool architectures. Alternative engines might also include an augmentor section (not shown) among other systems or features, or, may not include the fan section 22, such as in industrial gas turbine engines.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a second (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a first (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

In a further example, the fan 42 includes less than about 26 fan blades. In another non-limiting embodiment, the fan 42 includes less than about 20 fan blades. Moreover, in one further embodiment the low pressure turbine 46 includes no more than about 6 turbine rotors schematically indicated at 46a. In a further non-limiting example the low pressure turbine 46 includes about 3 turbine rotors. A ratio between the number of blades of the fan 42 and the number of low pressure turbine rotors 46a is between about 3.3 and about 8.6. The example low pressure turbine 46 provides the driving power to rotate the fan section 22 and therefore the relationship between the number of turbine rotors 46a in the low pressure turbine 46 and the number of blades in the fan section 22 discloses an example gas turbine engine 20 with increased power transfer efficiency.

Figure 2:
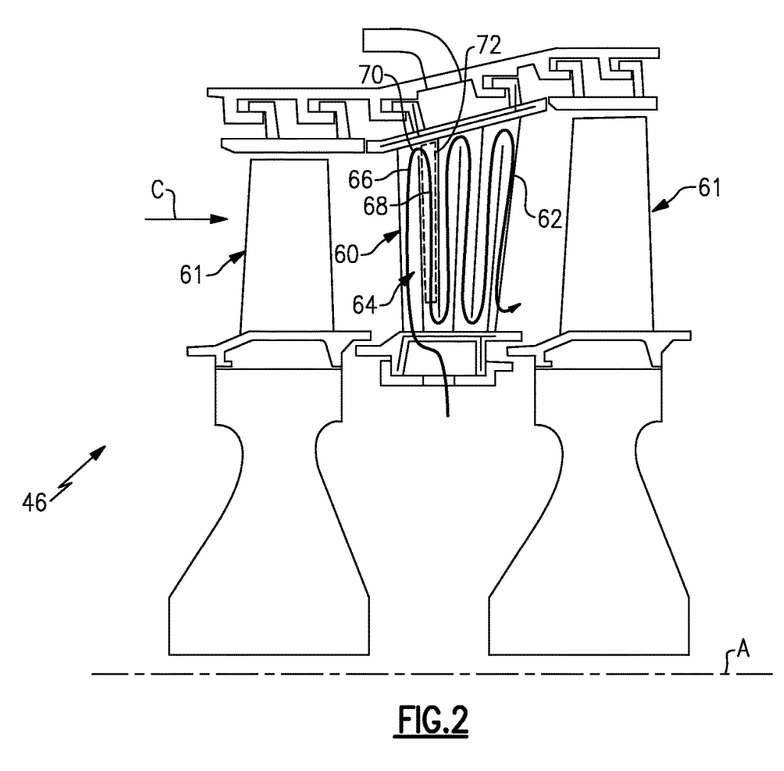
FIG. 2 illustrates a turbine section of the gas turbine engine of FIG. 1.

FIG. 2 illustrates a portion of the low pressure turbine 46 that includes an airfoil 60. In this example, the airfoil 60 is a vane that is situated between two rotatable blades 61. It is to be understood that although the examples herein are described with respect to the airfoil 60 as a vane, the examples are also applicable to rotatable blades (airfoils) or other airfoils in other sections of the engine 20, including other sections of the turbine section 28 or the compressor section 24.

The airfoil 60 includes an airfoil body 62 that has an internal passage 64 that serves to convey a fluid flow through the airfoil 60. For example, the fluid flow is relatively cool air from the compressor section 24. Although not limited, the internal passage 64 in this example is a serpentine passage that winds radially back and forth within the airfoil body 62. In this regard, the internal passage 64 includes at least first and second passage sections 66/68, and a turn section 70 that connects the first and second passage sections 66/68. The fluid flow is thus conveyed through the internal passage 64 and is then discharged into the core flow path C through holes in the airfoil body 62.

Figure 3A:
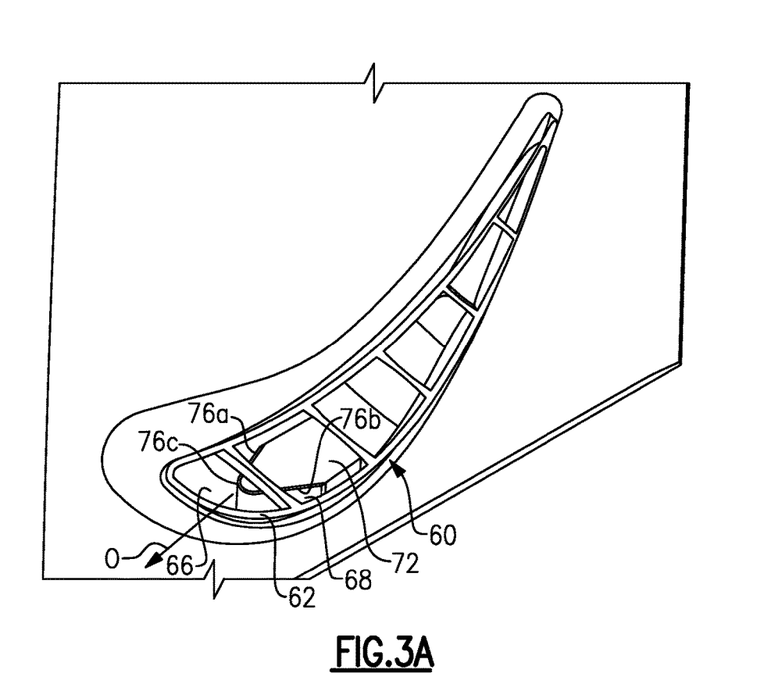
FIG. 3A illustrates a sectioned, radial-outward view of an airfoil of the gas turbine engine of FIG. 1.
Figure 3B:
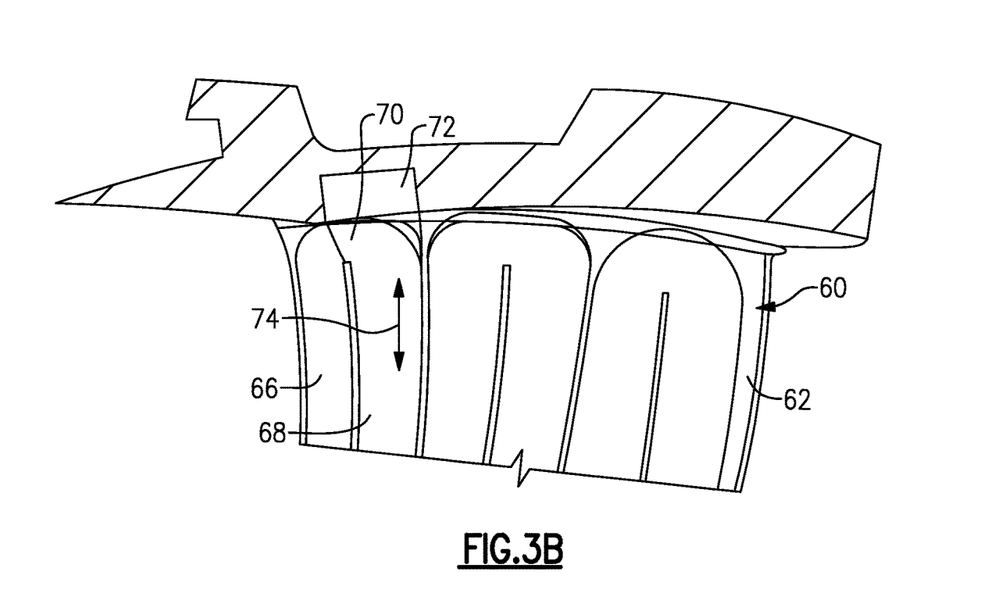
FIG. 3B illustrates an axially-sectioned view of the airfoil of FIG. 3A.

FIG. 3A illustrates a sectioned, radial-outward view through the airfoil 60, and FIG. 3B illustrates an axially-sectioned view of the airfoil 60. The airfoil 60 includes a baffle 72 that, in this example, is situated in the second passage section 68 and the turn section 70. As will be appreciated, the baffle 72 could alternatively be designed for implementation in other turn sections of the internal passage 64. Although not limited, the baffle 72 can be fabricated of a metal or metal alloy, such as sheet metal, by additive manufacturing, or by casting.

Figure 4:
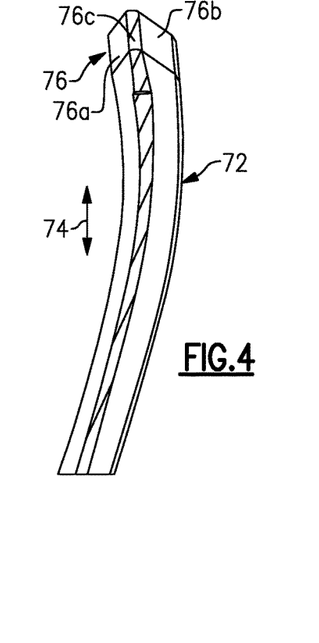
FIG. 4 illustrates an isolated view of the baffle of the airfoil of FIGS. 3A and 3B.

FIG. 4 illustrates an isolated view of the baffle 72. In this example, the baffle 72 is elongated in a longitudinal direction 74, which is parallel or substantially parallel to a radial direction with respect to the central axis A of the engine 20. The baffle 72 includes a wedge region 76 that is situated in at least the turn section 70 of the internal passage 64. The wedge region 76 includes a first sloped side 76a, a second sloped side 76b, and an apex 76c that joins the sloped sides 76a/76b. The apex 76c in this example is rounded, but alternatively could be a point. Additionally, the sloped sides 76a/76b in this example are planar or substantially planar. In alternative examples, the sloped sides 76a/76b could be convex or a more complex, compound shape. Regardless of the particular shape, the sloped sides 76a/76b can be acutely angled or positioned with respect to one another.

The wedge region 76 is oriented to either divide or join the fluid flow through the turn section 70, depending on which direction the fluid flow is design to flow. For example, the apex 76c is oriented or pointed toward a direction, as represented at O, transverse to the longitudinal direction 74 of the baffle 72. That is, if the fluid flow is conveyed from the first passage section 66 to the second passage section 68, the wedge region 76, at the apex 76c, divides the flow, or alternatively if the fluid flow is conveyed from the second passage section 68 to the first passage section 66, the wedge region 76 at the apex 76c joins the fluid flow. In either case, the wedge region 76 provides a smooth transition of the fluid flow through the turn section 70. For example, without the wedge region 76, the flow can "hug" the outside of a turn section and cause a flow separation or bubble at the inside of the turn that can potentially cause a pressure loss. Additionally, if a baffle having a blunt side is used, the flow impinges upon the blunt side and must abruptly change direction, which can also potentially lead to a pressure loss.

In this regard, the wedge region 76 of the baffle 72 smoothly divides or joins the fluid flow at its apex 76c to thereby potentially reduce pressure losses.

Figure 5:
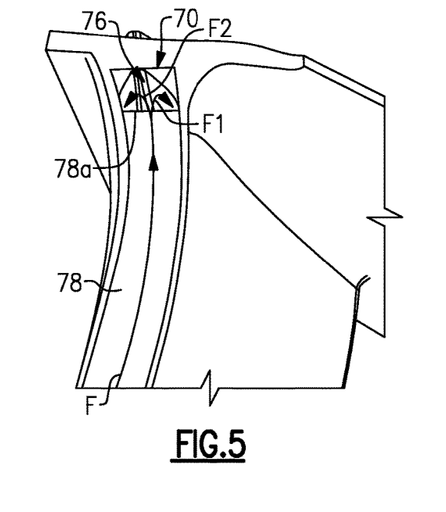
FIG. 5 illustrates a sectioned view of the airfoil showing a fluid flow across the baffle.

As an example, FIG. 5 illustrates a radially sectioned view taken along a rib 78 that partitions the first passage section 66 from the second passage section 68. The rib 78 has a terminal end 78a at the turn section 70. The fluid flow is represented at F. In this example, the flow F is conveyed radially through the first passage section 66 into the turn section 70 around the terminal end 78a. The flow F encounters the wedge region 76 of the baffle 72 in the turn section 70. The wedge region 76 divides the flow F such that a divided portion F1 flows along the first sloped side 76a of the wedge region 76 and another divided portion F2 flows along the second sloped side 76b of the wedge region 76. The flow F is thus smoothly divided and then continues to flow radially inward along the baffle 72 through the second passage section 68. The end of the baffle 72 adjacent to the wedge region 76 can extend outside of the internal passage 64, as shown in FIG. 5. In this regard, the end of the baffle 72 can be bonded/sealed to the airfoil body 62 to force the flow F toward the outside/external walls of the airfoil body 62 and down the baffle 72, and also fix the baffle 72 in the proper orientation.

Figure 6:
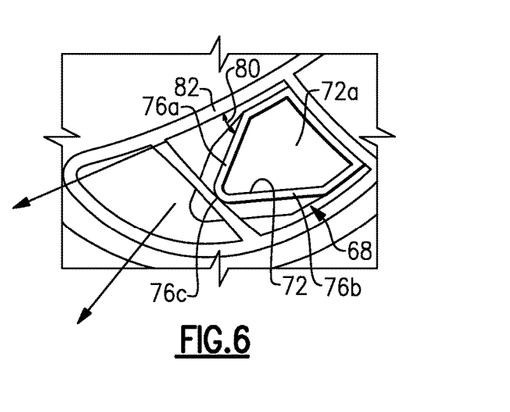
FIG. 6 illustrates an example angle of a baffle.

FIG. 6 illustrates an axially sectioned view through the wedge region 76. The first and second sloped sides 76a/76b of the wedge region 76 are generally spaced apart from the sides of the second passage section 68. For example, the slope or angle of the sloped sides 76a/76b is selected to maintain the required flow area to meet the desired heat transfer and pressure loss through the second passage section 68. For instance, the first sloped side 76a forms an angle, represented at 80, with respect to an immediately adjacent sidewall 82 of the turn section 70, and the angle 80 is less than 45°. In further examples, the angle 80 is in a range of 20° to 35°. In further examples, the angle 80 can be determined between a plane of the first sloped side 76a and a plane that is tangent to the sidewall 82 at the intersection of the sidewall 82 and the plane of the sloped side 76a. The slope or angle of the second sloped side 76b can be, but need not be, symmetric to the slope or angle of the first sloped side 76a, but can be selected such that the area for flow adjacent the first sloped side 76a is substantially equal to the area for flow adjacent the second sloped side 76b. Thus, the fluid flow F is relatively evenly divided, by flow and pressure, by the wedge region 76. In other embodiments, the location of apex 76c can be arranged to distribute more cooling flow to one side of the second passage 68 than the other.

Figure 7:
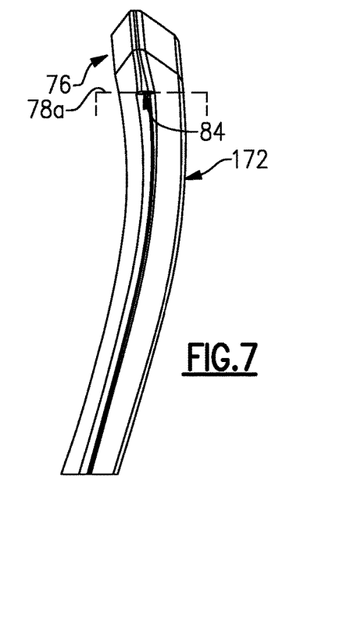
FIG. 7 illustrates another example baffle that includes a ledge inboard of a wedge region.

FIG. 7 illustrates another example baffle 172 that is somewhat similar to the baffle 72 but includes a ledge 84 radially inboard of the wedge region 76, relative to the axis A. When installed into the second passage section 68, the ledge 84 sits on the terminal end 78a (superimposed in FIG. 7) of the rib 78 between the first and second passage sections 66/68. The ledge 84 thus facilitates proper radial positioning of the baffle 172 in the second passage section 68 and facilitates stabilization of the baffle 172.

Figure 8:
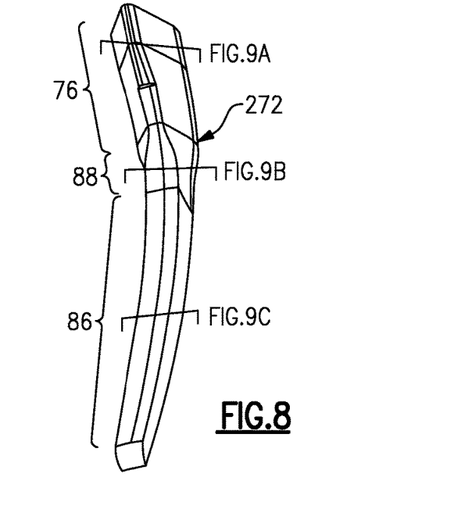
FIG. 8 illustrates another example baffle that includes a wedge region, a non-wedge region, and a transition region.

FIG. 8 illustrates another example baffle 272 that also has a wedge region 76. In this example, the general shape of the baffle 272 varies along its length. For example, the cross-sectional shape of the baffle 72 can be substantially the same along its length, although the shape may reduce in area. However, the baffle 272 includes the wedge region 76 and a non-wedge region 86 that are joined by a transition region 88. In the transition region 88, the slope or angle of the wedge region 76 becomes shallower toward the non-wedge region 86. Thus, the wedge region 76 smoothly transitions into the non-wedge region 86 such that there are no abrupt changes to the fluid flow along the baffle 272.

Figures 9A, 9B, 9C:
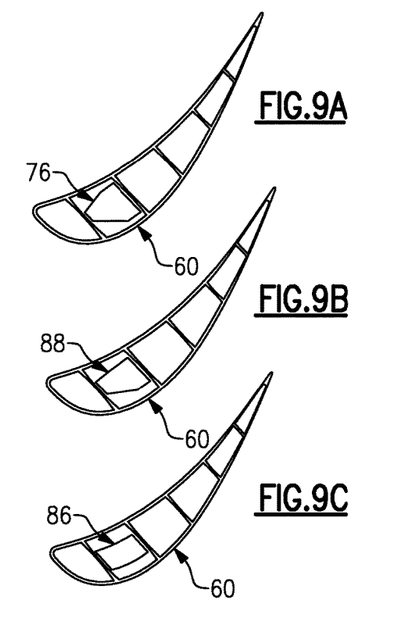
FIGS. 9A, 9B, and 9C illustrate, respectively, cross-sections taken through the wedge region, the transition region, and the non-wedge region of FIG. 8.

FIGS. 9A, 9B, and 9C illustrate cross-sections from, respectively, the wedge region 76, the transition region 88, and the non-wedge region 86. The slope or angle of the wedge region 76 becomes shallower, or broadens, in the transition region 88. Further along the length of the baffle 272, the transition region is fully transitioned to the shape of the non-wedge region 86, which in this example is generally rectangular.

Figure 10:
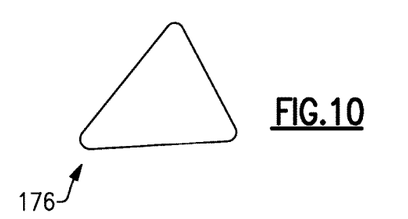
FIG. 10 illustrates another example wedge region having a generally triangular geometry.
Figure 11:
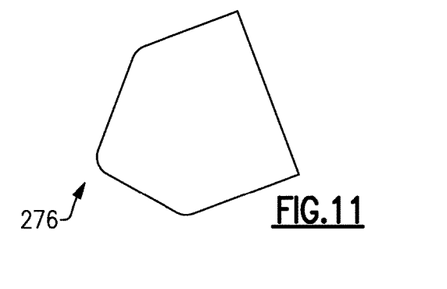
FIG. 11 illustrates another example wedge region having a generally pentagonal geometry.
Figure 12:
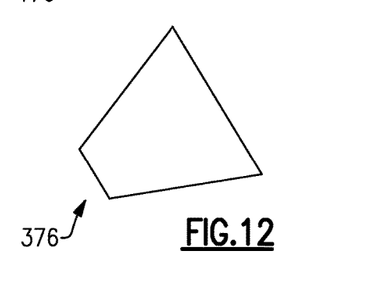
FIG. 12 illustrates another example wedge region having a trapezoidal geometry.

As can be appreciated, the shape of the wedge region 76 can be varied without departing from the spirit of this disclosure and while still accomplishing a division or joining of the fluid flow through the turn section 70. For example, FIGS. 10, 11, and 12 illustrate cross-sections of example wedge regions 176, 276, and 376, respectively. In the example shown in FIG. 10, the wedge region 176 is generally triangular and thus has three sides. In the example shown in FIG. 11, the wedge region 276 is generally pentagonal and thus has five sides. In the example shown in FIG. 12, the wedge region 376 is generally trapezoidal and thus has four sides. In the example shown in FIG. 9A, the wedge region 76 has six sides.

In the above examples, the baffle 72/172/272 can include a hollow interior 72a (FIG. 6) that facilitates reducing weight. For example, the hollow interior 72a is fluidly closed with respect to the internal passage 64 of the airfoil 60. That is, the baffle 72/172/272 does not have any openings or holes that permit fluid flow between the internal passage 64 and the hollow interior 72a. In this regard, unlike other baffles that serve for impingement cooling, the baffle 72/172/272 serves the purpose of taking up volume within the second passage section 68 to manage distribution of the flow and thus enhance cooling effectiveness.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
an airfoil body having an internal passage for conveying a fluid flow, the internal passage including first and second passage sections and a turn section connecting the first and second passage sections; and
a baffle in the second passage section and the turn section, the baffle including a wedge region situated in at least the turn section and oriented to either divide or join the fluid flow through the turn section, wherein the baffle is elongated and the wedge region has an apex, and the apex is oriented in a direction transverse to a longitudinal direction of the baffle.

2. The airfoil as recited in claim 1, wherein the baffle includes a non-wedge region and a transition region between the wedge region and the non-wedge region, and a slope of the wedge region becomes shallower along the transition region toward the non-wedge region.

3. The airfoil as recited in claim 1, wherein a rib separates the first and second passage sections, the rib having a terminal end at the turn section, and the baffle includes a ledge that sits on the terminal end of the rib.

4. The airfoil as recited in claim 1, wherein the wedge region includes first and second sloped sides that are joined at the apex, the first sloped side forming an angle with respect to an immediately adjacent side wall of the turn section, and the angle is less than 45°.

5. The airfoil as recited in claim 4, wherein the angle is in a range of 20° to 35°.

6. The airfoil as recited in claim 1, wherein the baffle is elongated and a cross-section of the wedge region taken transverse to a longitudinal direction of the baffle has three to six distinct sides.

7. The airfoil as recited in claim 1, wherein the baffle extends outside of the internal passage.

8. The airfoil as recited in claim 1, wherein the internal passage is a serpentine passage.

9. The airfoil as recited in claim 1, wherein the baffle has a hollow interior that is fluidly closed with respect to the internal passage of the airfoil.

10. A baffle for an airfoil, the baffle comprising:
an elongated body extending in a longitudinal direction and having a geometry that is complimentary to an internal passage of an airfoil, the elongated body including a wedge region at an end thereof, the wedge region including an apex that is oriented in a direction transverse to the longitudinal direction, wherein the baffle includes a ledge longitudinally offset from the end.

11. The baffle as recited in claim 10, wherein the baffle includes a non-wedge region and a transition region between the wedge region and the non-wedge region, and an angle of the wedge region becomes shallower along the transition region toward the non-wedge region.

12. The baffle as recited in claim 10, wherein the wedge region includes first and second sloped sides that are joined at the apex, the first and second sloped sides forming an acute angle with respect to each other.

13. The baffle as recited in claim 10, wherein a cross-section of the wedge region taken transverse to the longitudinal direction of the baffle has three to six distinct sides.

14. The baffle as recited in claim 10, wherein the baffle has a hollow interior that is fluidly closed.

15. A gas turbine engine comprising:
a compressor section;
a combustor section in communication with the compressor section;
a turbine section in communication with the combustor section; and
at least one of the compressor section or the turbine section including an airfoil, the airfoil including:
an airfoil body having an internal passage for conveying a fluid flow, the internal passage including first and second passage sections and a turn section connecting the first and second passage sections, and
a baffle in the second passage section and the turn section, the baffle including a wedge region situated in at least the turn section and oriented to either divide or join the fluid flow through the turn section, wherein a rib separates the first and second passage sections, the rib having a terminal end at the turn section, and the baffle includes a ledge that sits on the terminal end of the rib.

16. The gas turbine engine as recited in claim 15, wherein the baffle includes a non-wedge region and a transition region between the wedge region and the non-wedge region, and an angle of the wedge region becomes shallower along the transition region toward the non-wedge region.

17. The gas turbine engine as recited in claim 15, wherein the baffle has a hollow interior that is fluidly closed with respect to the internal passage of the airfoil.

\* \* \* \* \*